United States Patent [19]

Bassemir et al.

[11] Patent Number: 4,854,969

[45] Date of Patent: Aug. 8, 1989

[54] LITHOGRAPHIC FOUNTAIN SOLUTIONS

[75] Inventors: Robert Bassemir, Queens, N.Y.; Ramasamy Krishnan, Sewaren; Arthur I. Lowell, Edison, both of N.J.

[73] Assignee: Sun Chemical Corporation, Fort Lee, N.J.

[21] Appl. No.: 160,889

[22] Filed: Feb. 26, 1988

Related U.S. Application Data

[63] Continuation-in-part of Ser. No. 881,123, Jul. 2, 1986.

[51] Int. Cl.$^4$ .......................... C09K 3/00; C09K 3/18

[52] U.S. Cl. .......................................... 106/2; 106/20; 106/25; 106/26; 524/505; 524/555

[58] Field of Search ......................... 106/2, 20, 25, 26; 101/148, 451, 452; 524/505, 555

[56] References Cited

U.S. PATENT DOCUMENTS

| | | | |
|---|---|---|---|
| 3,231,504 | 1/1966 | Marion et al. | 252/137 |
| 3,294,693 | 12/1966 | Dupre et al. | 252/135 |
| 3,877,372 | 4/1975 | Leeds | 101/465 |
| 4,278,467 | 7/1981 | Fadner | 106/2 |
| 4,567,131 | 1/1986 | Watkiss | 106/2 |
| 4,604,952 | 1/1986 | Daugherty | 106/2 |

*Primary Examiner*—Amelia Burgess Yarbrough
*Attorney, Agent, or Firm*—Jack Matalon

[57] ABSTRACT

Lithographic fountain solutions containing water, one or more nonionic surfactants having an HLB in the range of 1 to 8 and one or more hydrotropes to maintain the surfactant in solution without increasing the HLB of the fountain solution.

18 Claims, No Drawings

LITHOGRAPHIC FOUNTAIN SOLUTIONS

RELATED APPLICATIONS

This application is a continuation-in-part of copending application Ser. No., 881,123, filed July 2, 1986.

FIELD OF INVENTION

This invention relates to lithographic fountain solutions, more specifically to lithographic fountain solutions which contain or are used with alcohol substitutes.

BACKGROUND OF THE INVENTION

The offset lithographic printing process employs planographic plates which transfer ink to a blanket roll which, in turn, then transfers the ink to a substrate thereby forming the printed images. The plates are referred to as planographic since the image and non-image areas are in the same plane. The plates are construed so that with proper treatment the image areas are hydrophobic and oleophilic and thereby receptive to inks. The non-image areas are hydrophilic and are water receptive. In order to maintain the hydrophilic characteristics on the non-image areas, it is necessary to continuously treat the plate with a water-based fountain solution.

The aqueous fountain solution is used to maintain the non-image areas of a lithographic printing plate insensitive to ink. While an offset printing press is running, fountain solution is continuously applied to the printing plate just before the application of the printing ink, or as a water in ink emulsion. The fountain solution has an affinity for the non-image, hydrophilic areas of the plate and immediately wets these areas. A complete and uniform film of fountain solution prevents the subsequent application of ink from covering the plate in a non-image area. The fountain solution and ink on the plate are then both transferred to the blanket and then to the printing substrate and the process begins again.

Lithographic printing plates are developed to expose a hydrophilic metal surface in the non-image areas, while image areas are left with a hydrophobic surface. There are many fountain solutions which will wet and coat the exposed metal surface of the non-image area of the plate. Plain water may temporarily perform fairly well, although aqueous solutions of various electrolytes, surfactants and water soluble polymers are generally required for good continuous performance. These additives promote plate wetting and fountain solution uniformity, as well as controlling the interaction of the fountain solution with the ink and the substrate.

Acid fountain solutions are the most widely used in commercial printing. While there is a trend toward more use of neutral pH fountain solutions, acidic solutions continue to be widely used because of the proven effectiveness of gum arabic, a water soluble polymer. Gum arabic is a protective colloid that desensitizes the non-image areas of the plate. Since gum arabic is best solubilized and most effective under acidic conditions, acidic fountain solutions continue to be preferred.

Many lithographic presses have a fountain solution distribution system that is separate from the ink distribution system. Generally, the conventional fountain solution distribution system includes a ductor roller which has intermittent or interrupted flow of the fountain solution from the reservoir to dampening form rollers that contact the printing plate. Often these conventional damping systems use paper or molleton (cloth) covered rollers or specially treated rollers in the dampening system roller train to act as intermediate fountain solution reservoirs. Alternatively, brushes can flick droplets of water onto form rollers or directly onto the plate or nozzles can similarly spray a fine-mist.

A growing number of lithographic presses are equipped with a continuous feed dampening system sold by Dahlgren Mfg. Co., Dallas, TX, under the tradename Dahlgren. Other dampening systems of the direct continuous type include the system sold by Miehle-Goss-Dexter, Chicago, IL, under the tradename Miehlematic, and by Harris Corp., Cleveland, OH, under the tradename Duo-Trol and Microflow and by Miller Western Mfg. Co., Pittsburgh, PA, under the tradename Millermatic.

In the Dahlgren system, the printing plate is contacted only by inked rollers, that is, the fountain solution must be carried from the dampening unit rollers by means of one or more inked rollers, usually one of the form rollers, to the printing plate. This type of system requires the assistance of a water tansport additive such as a water soluble glycol as disclosed in U.S. Pat. No. 3,625,715 or an alcohol such as disclosed in U.S. Pat. No. 3,168,037, with isopropanol being almost universally used. The excellent and more independent control of ink and water delivery to the printing plate accounts for the increasing use of this type of dampening system in lithographic printing. This, in turn, accounts for the extensive use of isopropanol in the Dahlgren continuous dampening system. Typically, the fountain solution will contain between about 5 to 30 percent isopropanol depending upon the specific press, speed, type of form and substrate being printed. The use of isopropanol rather than the other alcohols is the best compromise between good press and printing performance and cost of the fountain solution.

Another variety of a continuous contact dampening system is the Millermatic type wherein the fountain solution is applied to the printing plate by means of a dampener form roller that is not part of the inking system. With such an arrangement it would be expected that isopropanol would not be required because the inked form roller is not used to distribute the aqueous fountain solution. Because, however, of the excellent ink and water balance control, it is also common to use isopropanol as a constituent in the dampening solution used with the Millermatic type of dampener.

The typical fountain solution is made up from a fountain solution concentrate, water and an alcohol or alcohol substitute. The fountain solution concentrate generally includes buffering salts, protective colloids, i.e. water-soluble resins or gums such as gum arabic or cellulose gum and frequently a surfactant (wetting agent). The typical fountain solutions for commercial printing are generally acidic and include acidic components such as phosphoric and/or citric acid to maintain a pH value between about 3.5 and 5.5, although neutral and basic fountain solutions are also used.

Alcohol (isopropanol) and alcohol substitutes are commonly added to fountain solutions. These additions are required for efficient operation with certain types of continuous dampening systems (Dahlgren, Duo-Trol, Miehlematic, etc.). Even with conventional systems, smaller amounts of alcohol have frequently been proven to be beneficial. Generally speaking, alcohol will make a borderline dampening solution work better by lowering the surface tension of the water. Also, it minimizes the fountain solution use while maintaining moisture on the plate surface. Reduced water pick up makes it easier for the pressman to maintain the correct ink/water balance. Also, the rapid evaporation of the alcohol from the film of fountain solution on the blanket and printed sheet helps to minimize the paper's tendency to curl. Generally about 5 to 30% of a fountain solution can be isopropanol.

Environmental concerns about press room emissions as well as the cost of alcohol have led to the use of alcohol substitutes. These can perform some, but generally not all, of the functions of isopropanol. Because of these concerns for isopropanol, a number of materials have been suggested as replacements in fountain solutions. Additives such as 2-butoxy ethanol and ethylene glycol have been used as substitutes for isopropanol. U.S. Pat. No. 3,877,372 discloses a fountain solution which includes 2-butoxy ethanol and at least one of hexylene glycol and ethylene glycol, a silicone glycol copolymer and a defoamer type surfactant. U.S. Pat. No. 4,278,467 discloses an isopropanol-free fountain solution which includes an additive having a surface tension less than about 50 dynes/cm such as n-hexoxyethylene glycol (n-hexyl Cellosolve), n-hexoxydiethylene glycol (n-hexyl carbitol), 2-ethyl-1,3-hexanediol, n-butoxyethylene glycolacetate, n-butoxydiethyleneglycolacetate, 3-butoxy-2-propanol and mixtures thereof. U.S. Pat. No. 4,560,410 discloses a fountain solution containing a mixture of a polyol and/or glycol ether partially soluble in water with a polyol and/or glycol ether completely soluble in water.

The use of higher boiling solvents such as glycols, glycol ethers and glycol ether acetates as alcohol substitutes for isopropanol in fountain solutions has resulted in a higher dynamic surface tension. The higher dynamic surface tension reduces the performance and effectiveness of the fountain solution due to decreased wetting action at press speeds. In addition, certain fountain solution concentrate systems containing alcohol substitute systems cannot be supplied in a one-step form because of precipitation of one or more components when mixed with the alcohol substitutes. A one-step fountain solution concentrate is desirable because of the simplicity of metering it on existing dilution equipment.

SUMMARY OF INVENTION

This invention comprises a formulation which produces superior lithographic performance in that wide water latitude and less fountain solution feed is obtained on the press.

The invention involves the use of a hydrotrope and nonionic surfactants in an aqueous fountain solution or fountain solution concentrate. This invention permits elimination or reduction of the use of alcohol and, if used in combination with alcohol, performance and effectiveness of the fountain solution can be further enhanced.

DETAILED DESCRIPTION OF THE INVENTION

It has now been found that when a hydrotrope is added with a nonionic surfactant to a fountain solution or fountain solution concentrate, the solubility of the surfactant is increased thus lowering the dynamic surface tension and enhancing the wetting action and performance of the fountain solution during the lithographic printing process.

The surfactant for use in this invention is of the nonionic type and has a hydrophilic-lipophilic balance ("HLB") in the range of about 1 to 8, preferably 3 to 5. Most surfactants are effective to lower the static tension, but many are ineffective to bring about a reduction in the dynamic surface tension of the fountain solution. Thus, they are ineffective vis-a-vis lithographic processes. Furthermore, many surfactants, especially those commonly classified as detergents, although useful in lowering both the dynamic and static tension of the fountain solution, are undesirable since they create other problems in lithography in that they encourage the formation of undesirable oil-in-water emulsions.

It has been found that the use of water-soluble surfactants or merely solubilizing a relatively water-insoluble surfactant will not result in a fountain solution which meets the requirements of the graphic arts industry, especially the fine balance of properties required for modern lithographic processes. The kinetics of diffusion can affect the dynamic and static surface tensions quite differently.

Suitable nonionic surfactants having the requisite HLB of about 1 to about 8 include those selected from the group consisting of block copolymers of propylene oxide and ethylene oxide; block copolymers of propylene oxide, ethylene oxide and ethylenediamine; and $C_1$–$C_{20}$ ethoxylated alcohols, amides, fatty acid esters, alkanol amides, glycol esters, ethoxylated alkyl phenols, ethoxylated acetylenic glycols, ethoxylated acetylenic carbinols, acetylenic glycols, acetylenic carbinols, silicone glycols, silicone alkylene oxide copolymers and mixtures thereof. In general, the amount of surfactant will range from 0.05 to 20% by weight of the water present in the fountain solution.

The hydrotrope employed in this invention is an electrolyte with an inorganic and an organic ion. The function of the hydrotrope is to assist in the solubilization of the nonionic surfactant in water. The desirable hydrotrope will not only provide this solubilization function but will also not increase the HLB of the fountain solution so as to have an adverse impact on the lithographic printing process. Suitable hydrotropes are those selected from the group consisting of sodium toluene sulfonate, sodium xylene sulfonate, sodium cumene sulfonate, sodium terpene sulfonates, ammonium toluene sulfonate, ammonium xylene sulfonate, ammonium cumene sulfonate, tetrabutyl ammonium hydrogen sulfate, tetraphenyl phosphonium bromide, tetrabutyl ammonium bromide, sodium thiocyanate and mixtures thereof.

The hydrotropse is used in an amount effective to increase the solubility of the nonionic surfactant, preferably in an amount sufficient to maintain the surfactant dissolved in the fountain solution concentrate. Generally the amount of hydrotrope utilized for this invention will range from 1:1 to 10:1 parts by weight, preferably 4:1 to 6:1 parts by weight, per part of surfactant.

The fountain solution or fountain solution concentrate generally contains several other ingredients. These can include protective colloids, i.e. water-soluble polymers, in particular water-soluble gums which contain carboxyl and hydroxyl groups. Gum arabic is the oldest and most widely used polymer and is typically added as a 14° Baume' solution. Cellulose gum (i.e. carboxymethyl cellulose, hydroxyethyl cellulose, methyl cellulose), gum tragacanth, guar gum and karaya gum as well as styrene maleic anhydride copolymers, polyvinyl pyrrolidone, and the like, (as well as mixtures of the aforesaid polymers) may also be used. These polymers are generally used to help protect the non-image areas of a plate from contamination by ink and to maintain the area hydrophilic. In general, the amount of protective colloid will range from 5 to 25% by weight based on the weight of water in the fountain solution concentrate and 0.1 to 2% by weight of the diluted fountain solution.

The fountain solution or fountain solution concentrate can also contain buffering salts effective to maintain a desired pH. The fountain solutions are preferably used as aqueous acidic solutions having a pH of about 3.5 to 5.5. Phosphoric acid is a preferred acid for use in acidifying the formulation. Other acids which can be used include inorganic as well as organic acids, such as acetic acid, nitric acid, sulfuric acid, glycolic acid, citric acid, phthalic acid and mixtures of such acids and the like. The buffering salts can include disodium hydrogen phosphate, dipotassium hydrogen phosphate, sodium hydrogen phthalate, potassium hydrogen phthalate, sodium dihydrogen phosphate, potassium dihydrogen phosphate, sodium acetate, sodium citrate, sodium glycolate and mixtures thereof.

Other additives which may be employed in the fountain solution include biocides such as phenol, 6-acetoxy-2,4-dimethyl-m-dioxane, 1,2-benziso-thiazolin-3-one, 2-[(hydroxymethyl) amino]ethanol, 37% formaldehyde in water, quaternary ammonium salt of the trialkyl benzyl type and the like; corrosion inhibitors such as zinc nitrate, magnesium nitrate, aluminum nitrate and the like; anti-foaming agents, dyes, etc.

The fountain solution or fountain solution concentrate can also contain an alcohol or alcohol substitute. While an alcohol such as isopropanol or alcohol substitutes can be used as additives to the fountain solution of this invention, the hydrotrope in combination with the surfactant reduces the dynamic surface tension sufficiently for good lithographic performance such that their use is not required.

If an alcohol is to be utilized in the fountain solution, it is preferred that such alcohol be isopropyl alcohol and it should be utilized in a maximum amount of less than 10 volume % based on the volume of water present in the fountain solution.

It has been found that the fountain solutions of this invention increase the efficiency of alcohol substitutes if added to the solutions. In addition, precipitation problems are eliminated, thereby allowing the use of "one-step" formulations containing alcohol substitutes in situ. Typical alcohol replacements include 2-butoxy ethanol, n-hexoxyethanol, ethylene glycol, 2-ethyl-1,3-hexane diol, 1-methoxy-2-propanol, 1-propoxy-2-propanol, 1-butoxy-2-propanol, dipropyleneglycol methyl ether and mixtures thereof.

Typically, the fountain solution is initially prepared as a concentrate (etch). The concentrate is usually diluted with 20 to 100 volumes of water and may be further diluted with an alcohol and/or alcohol substitute if desired to obtain the fountain solution ready for lithographic printing.

The addition of hydrotrope to a fountain solution resulting in increased solubility of the surfactant and a reduction in the dynamic surface tension at press speeds has resulted in a number of major advantages including a wider latitude with regards to the amount of water use (i.e. wider water balance) and the ability to greatly reduce the water usage. In addition, other advantages which have been observed include faster clean-up of the lithographic plates, reduced and more easily removed pilings on the non-image area of the blanket and cleaner fountain solution sumps due to reduced ink feedback.

EXAMPLE 1

A fountain solution concentrate was prepared containing 77% by weight water, 11% by weight gum arabic, 7% by weight magnesium nitrate, 1.4% by weight citric acid, 1.3% by weight phosphoric acid (85% solution), 1.2% by weight disodium hydrogen phosphate and 0.25% by weight block copolymer of ethylene oxide/propylene oxide plus 0.2% by weight preservatives and anti-foaming agents.

Upon addition of $2\frac{1}{2}$ oz. (74 ml.) of the concentrate to $2\frac{1}{2}$ oz. (74 ml.) of alcohol replacement (containing 34% by weight ethylene glycol, 58% by weight 2-butoxyethanol, 4.6% by weight, 3,5-dimethyl-1-hexyn-3-ol and 2.9% by weight 2,4,7,9-tetramethyl-5-decyne-4,7-diol), a precipitate was formed. This concentrated mixture was then diluted with one gallon (3.8 l) of water to produce a press-ready fountain solution. This solution did not run with any water control on a Dahlgren-dampened Miehle press.

The addition to the fountain solution of $2\frac{1}{2}$ oz. of hydrotrope (an aqueous solution containing 42% by weight of equal amounts of sodium cumene sulfonate, sodium toluene sulfonate and ammonium xylene sulfonate) provided a fountain solution which ran with a water balance of 5 notches (90-95) and scumming at 90 notches indicating the press could run. The fountain solution containing hydrotrope had a dynamic surface tension of 36 dynes/cm., as measured in Example 2 below.

EXAMPLE 2

The addition of a hydrotrope allows one to prepare a composite one-step fountain solution concentrate without precipitation of solids occurring.

A fountain solution concentrate was prepared as per Example 1. A mixture was made with $2\frac{1}{2}$ oz. of the concentrate with 4 oz. of the alcohol replacement of Example 1 and 4 oz. of ammonium xylene sulfonate (42% by weight in water). No precipitate was observed in this concentrate. This mixture was then diluted with one gallon of water. The dynamic surface tension of this diluted fountain solution with hydrotrope was 32.0 dynes/cm at a surface renewal rate of 200 milliseconds as measured with a Sensadyne Surface Tensiometer 5000. Prior to the addition of hydrotrope, the fountain solution had a dynamic surface tension of 39 dynes/cm, despite the fact that the hydrotrope is not by itself surface active.

In a sheet fed press trial, using a Dahlgren dampening system, the above fountain solution with hydrotrope ran with a water balance of 15 notches (70–85) with scumming at 65 notches. A 15 notches water balance is a very wide water balance which allows efficient lithographic performance.

EXAMPLE 3

In a fountain solution containing 2 oz./gallon of the fountain solution concentrate of Example 1 and 5% by volume of the fountain solution of isopropanol, the addition of 4 oz./gallon of an aqueous solution containing by weight 8.3% 3,5-dimethyl-1-hexyn-3-ol, 8.3% 2,4,7,9-tetramethyl-5-decyne-4,7-diol, 17.5% sodium cumene sulfonate, 17.5% ammonium xylene sulfonate and 48.4% water gave a wide water balance of 65 notches to 85 notches with a dynamic surface tension of 28 dynes/cm., as measured above. Without the addition of hydrotropes, the water balance was 80 to 90 notches with a dynamic surface tension of 31 dynes/cm., as measured above.

EXAMPLE 4

A solvent-free fountain solution was prepared containing 2½ oz./gallon of the fountain solution concentrate of Example 1 and 4 oz./gallon of an aqueous solution containing 38.6% by weight ammonium xylene sulfonate, 4.5% by weight 3,5-dimethyl-1-hexyn-3-ol and 3.5% by weight of 2,4,7,9-tetramethyl-5-decyne-4,7,-diol and 53.4% by weight water.

The water balance was 75–85 notches with catchup at 70 on a Dahlgren dampening system. The dynamic surface tension was 30.5 dynes/cm., as measured above.

EXAMPLE 5

A fountain solution concentrate was prepared containing 90% by weight of sodium toluene sulfonate (42% by weight aqueous solution) and 10% by weight 2,4,7,9-tetramethyl-5-decyne-4,7-diol. A fountain solution containing 3 oz./gallon of the concentrate was run on a Chambon Press using a Dahlgren type dampening system. Radiation curing inks of the various colors (cyan, magenta, yellow and black) all ran well on the lithographic press.

EXAMPLE 6

A phosphorylated hydrotrope is not useful for the purposes of this invention.

To a fountain solution containing 2.5 oz./gal. of the concentrate of Example 1 and 4 oz./gal. of the Example 1 alcohol replacement was added 3 oz./gal. of a phosphorylated hydrotrope (Rohm & Haas "Triton QS44"). Although a uniform product was obtained as in the case of Example 1, when the product was used in a sheetfed press trial with a Dahlgren dampening system, the chrome rollers were severely contaminated with ink which markedly reduced the print density.

EXAMPLE 7

Example 6 was repeated using a potassium salt of "Westvaco Diacid" 1550 dicarboxylic acid (a $C_{21}$ dicarboxylic acid). Salts of this acid are stated to be superior in hydrotropic ability versus phosphate esters, sulfonates and sodium xylene sulfonate as measured by the Draves wetting test.

When the same type of press trial was carried out, heavy stripping on the roller train occurred. Therefore, sufficient ink could not be transferred to obtain the desired print density. Moreover, very heavy contamination occurred on the chrome roller in the pan, leading to non-uniform transfer of the fountain solution.

EXAMPLE 8

Example 6 was repeated using 0.1 wt. % of sulfated tridecyl alcohol with 6 moles of ethylene oxide. The same type of press trial was carried out and very heavy stripping of the ink on the roller train occurred. In addition, the plate exhibited signs of image area blinding, leading to loss of print density and complete loss of image.

What is claimed is:

1. Lithographic fountain solution comprising:

(a) water;

(b) a nonionic surfactant having an HLB in the range of 1 to 8 selected from the group consisting of block copolymers of propylene oxide and ethylene oxide; block copolymers of propylene oxide, ethylene oxide and ethylenediamine; and $C_1$–$C_{20}$ ethoxylated alcohols, amides, fatty acid esters, alkanol amides, glycol esters, ethoxylated alkyl phenols, ethoxylated acetylenic glycols, ethoxylated acetylenic carbinols, acetylenic glycols, acetylenic carbinols, silicone glycols, silicone alkylene oxide copolymers and mixtures thereof; and (c) a hydrotrope selected from the group consisting of sodium toluene sulfonate, sodium xylene sulfonate, sodium cumene sulfonate, sodium terpene sulfonates, ammonium toluene sulfonate, ammonium xylene sulfonate, ammonium cumene sulfonate, tetrabutyl ammonium hydrogen sulfate, tetraphenyl phosphonium bromide, tetrabutyl ammonium bromide, sodium thiocyanate and mixtures thereof, the ratio of hydrotrope to surfactant being in the range of about 1:1 to about 10:1.

2. The fountain solution of claim 1 wherein the surfactant is a $C_8$–$C_{16}$ acetylenic glycol.

3. The fountain solution of claim 1 wherein the surfactant is a $C_5$–$C_{12}$ acetylenic carbinol.

4. The fountain solution of claim 1 wherein the surfactant is an ethoxylated $C_8$–$C_{16}$ acetylenic glycol.

5. The fountain solution of claim 1 wherein the surfactant is an ethoxylated $C_5$–$C_{12}$ acetylenic carbinol.

6. The fountain solution of claim 1 wherein the surfactant has an HLB in the range of 3 to 5.

7. The fountain solution of claim 1 wherein the hydrotrope is sodium toluene sulfonate.

8. The fountain solution of claim 1 wherein the hydrotrope is sodium xylene sulfonate.

9. The fountain solution of claim 1 wherein the hydrotrope is sodium cumene sulfonate.

10. The fountain solution of claim 1 wherein the hydrotrope is ammonium xylene sulfonate.

11. The fountain solution of claim 1 wherein the ratio of hydrotrope to surfactant is within the range of 4:1 to 6:1 by weight.

12. The fountain solution of claim 1 further comprising an alcohol replacement selected from the group consisting of 2-butoxy ethanol, n-hexoxyethanol, ethylene glycol, 2-ethyl-1,3-hexane diol, 1-methoxy-2-propanol, 1-propoxy-2-propanol, 1-butoxy-2-propanol, dipropyleneglycol methyl ether and mixtures thereof.

13. The fountain solution of claim 1 further comprising less than 10 vol. % of isopropanol, based on the volume of water present in the solution.

14. The fountain solution of claim 1 further comprising a buffering salt selected from the group consisting of disodium hydrogen phosphate, dipotassium hydrogen phosphate, sodium hydrogen phthalate, potassium hydrogen phthalate, sodium dihydrogen phosphate, potassium dihydrogen phosphate, sodium acetate, sodium citrate, sodium glycolate and mixtures thereof.

15. The fountain solution of claim 1 further comprising a water soluble gum selected from the group consisting of gum arabic, gum tragacanth, guar gum, karaya gum, cellulose gum and polyvinyl pyrrolidone.

16. The fountain solution of claim 1 further comprising an acid selected from the group consisting of phosphoric acid, acetic acid, nitric acid, phthalic acid, citric acid, sulfuric acid, glycolic acid and mixtures thereof.

17. The fountain solution of claim 1 further comprising a biocide.

18. The fountain solution of claim 1 further comprising an oxidizing salt selected from the group consisting of magnesium nitrate, zinc nitrate, aluminum nitrate and mixtures thereof.

* * * * *